UNITED STATES PATENT OFFICE.

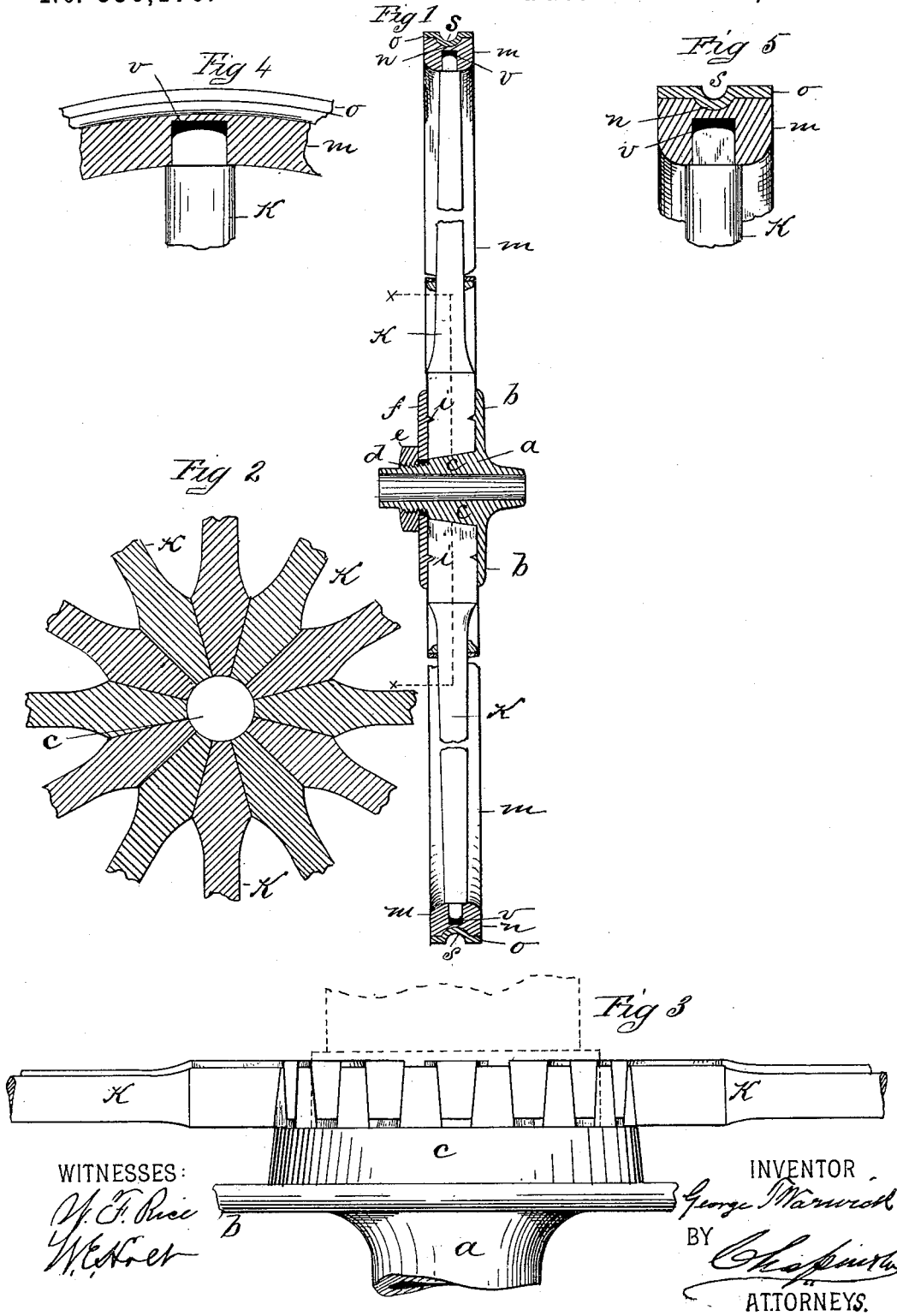

GEORGE T. WARWICK, OF SPRINGFIELD, MASSACHUSETTS.

VEHICLE-WHEEL.

SPECIFICATION forming part of Letters Patent No. 350,176, dated October 5, 1886.

Application filed January 18, 1886. Serial No. 188,906. (No model.)

*To all whom it may concern:*

Be it known that I, GEORGE T. WARWICK, a citizen of England, residing at Springfield, in the county of Hampden and State of Massachusetts, have invented new and useful Improvements in Vehicle-Wheels, of which the following is a specification.

This invention relates to improvements in vehicle-wheels, and to that class thereof known as "expanding-wheels," the object being to provide a spoke of improved form for use with a hub having an inclined abutment, an improved felly and tire, and an improved end bearing for the spoke in the felly, all as hereinafter described, and pointed out in the claims.

In the drawings, Figure 1 is a vertical cross-section of a wheel embodying my improvements. Fig. 2 is a central section in the plane of the wheel on line $x$ $x$, Fig. 1. Fig. 3 is a side elevation in full and in dotted lines of the central part of the wheel-hub, showing the inner end of several of the spokes. Fig. 4 is a side elevation of the end of one spoke and an edge view of a segment of the tire, and a longitudinal view of a section of the felly through one of the spoke-holes therein. Fig. 5 is a transverse section of the tire and felly through a spoke-hole and a side view of the end of a spoke.

In the drawings, $a$ is the hub of the wheel, made, preferably, of suitable cast metal, having centrally thereon the spoke-abutment $c$, of conical form, or whose sides are inclined to the axis of the hub. At one end of the abutment $c$ on the hub is a circular flange, $b$, which is fixed thereon, whose inner face is substantially at right angles to the axis of the hub. Immediately adjoining the small end of the abutment $c$ a screw-thread, $d$, is formed on the hub, on which is properly fitted a nut, $e$. A loose flange, $f$, is adapted to be placed on the hub at or opposite the said small end of the abutment $c$, between the latter and said nut, said flange $f$ having several projecting teeth or pointed studs thereon, $i$, to engage with the sides of the spokes $k$ by being forced into the latter, as hereinafter set forth. The spokes $k$ of the wheel are constructed as shown—that is to say, the sides thereof against which the flanges $f$ and $b$ bear are parallel, and the sides thereof, which bear against each other, as shown in Fig. 2, are tapering, and the end of each spoke is formed at an incline to the front and rear side thereof corresponding to the incline of the conical abutment $c$ on the hub $a$, as clearly shown in Fig. 1. The meeting sides of the tapered ends of the spokes are not made at right angles to their front and rear faces, but in cross-section their form is that of a truncated cone, as shown in Fig. 3, where the ends of several of said spokes are shown side by side, but in reverse order relative to said truncated form—that is to say, they are arranged on the abutment $c$, so that alternately the thick and thin faces of the spokes appear on the front and rear sides of the wheel behind the flanges $f$ and $b$.

The object in forming the ends of the spokes as above described is to provide for assembling the spokes on the abutment $c$ of the hub without having any open joints appear between the spokes after the ends of the latter have been forced back against the flange $b$ to give the spokes their extreme outward movement, whereby the requisite tension is put upon the wheel.

The within-described wheel outside of the hub is all assembled before the hub is placed between the inner ends of the spokes and the said tension is imparted to the wheel, and by slipping the ends of the spokes more or less laterally, as in Fig. 3, they may be engaged with the small end of the conical abutment $c$ sufficiently to determine their positions, and their flange $f$ is put against their sides and forced against the latter by the nut $e$, finally bringing said ends all to a uniform position against the flange $b$, whereby joints between said ends are completely closed when the spokes have completed their extreme outward movement. The felly $m$ of the wheel is provided with the usual spoke-sockets, and each of the latter is provided with a rubber cushion, $v$, against which the outer end of the spoke bears, whereby the common rattling noise of the spoke and felly in dry weather is obviated, and a yielding bearing between the end of the spoke and the felly is provided, and for a purpose hereinafter described the outer face of the latter is provided with an annular groove about midway between its sides.

It is found in practice that a new wheel-tire whose edges are not worn round serves by its inclination to engage more readily with the ground than does a worn tire, to prevent much of the lateral swaying of a carriage, and in order to provide additional ground-engaging edges on a wheel-tire for said purpose the tire, o, herein shown, is provided with the central annular groove, s, in its outer surface, the tire being so formed that by making said groove a corresponding rib, n, is produced on its inner surface, which fits into said annular groove in the felly, and thereby any lateral movement of the tire on the latter is prevented, and while due tension is maintained on the wheel no tire-bolts are required. The said tire may be shrunk onto a grooved felly, if desired.

The wheel is assembled by first placing the felly with the rubber cushions in the spoke-sockets thereof in the tire, then placing each spoke within the felly arranged in the order above set forth and finally securing the hub and spokes together, as described.

What I claim as my invention is—

1. A vehicle-wheel constructed with a hub, a, provided with a conical spoke-abutment, c, and with the fixed flange b at the larger end of said abutment, and having the nut e screwed thereon opposite the small end of the latter, combined with the loose flange f, the spokes k, having their inner ends made in the form in cross-section of truncated cones, the felly m, having an annular groove in its periphery, and the tire o, having the rib n to fit said groove in the felly and the annular groove s in its outer surface, substantially as set forth.

2. The hub a, having the conical spoke-abutment c, the fixed flange b at the larger end of said abutment, and the nut e, screwed thereon opposite the small end of the latter, combined with the loose flange f, the spokes k, the felly m, having an annular groove in its periphery and the rubber cushions v in its spoke-holes, and the tire o, having the rib n to fit said annular groove in the felly and the annular groove s in its outer surface, substantially as set forth.

3. A vehicle-wheel having a tire provided with an annular groove in its outer surface midway between its edges and a corresponding rib projecting from its inner surface, combined with a felly having a groove in its periphery to receive said rib, a series of spokes, and a hub, a, having the conical spoke-abutment c, and means, substantially as described, for clamping the inner ends of said spokes on said abutment, substantially as set forth.

GEO. T. WARWICK.

Witnesses:
H. A. CHAPIN,
W. F. RICE.